United States Patent
Ko et al.

(10) Patent No.: US 10,494,478 B2
(45) Date of Patent: Dec. 3, 2019

(54) METHOD FOR PREPARING POLYCARBONATE

(71) Applicant: LG CHEM, LTD., Seoul (KR)

(72) Inventors: Un Ko, Daejeon (KR); Byoungkue Chun, Daejeon (KR); Moo Ho Hong, Daejeon (KR); Young Wook Son, Daejeon (KR); Tae Yun Ko, Daejeon (KR)

(73) Assignee: LG CHEM, LTD., Seoul (KR)

( * ) Notice: Subject to any disclaimer, the term of this patent is extended or adjusted under 35 U.S.C. 154(b) by 39 days.

(21) Appl. No.: 15/765,686

(22) PCT Filed: Jun. 29, 2017

(86) PCT No.: PCT/KR2017/006904
§ 371 (c)(1),
(2) Date: Apr. 3, 2018

(87) PCT Pub. No.: WO2018/043899
PCT Pub. Date: Mar. 8, 2018

(65) Prior Publication Data
US 2019/0085122 A1 Mar. 21, 2019

(30) Foreign Application Priority Data
Aug. 31, 2016 (KR) .................. 10-2016-0111868

(51) Int. Cl.
*C08G 64/24* (2006.01)
*C08G 64/40* (2006.01)
*C08K 5/526* (2006.01)
*C08K 5/134* (2006.01)
*C08K 5/13* (2006.01)
*C08K 5/5313* (2006.01)
*C08K 5/1515* (2006.01)

(52) U.S. Cl.
CPC ........... *C08G 64/406* (2013.01); *C08G 64/24* (2013.01); *C08K 5/13* (2013.01); *C08K 5/134* (2013.01); *C08K 5/1515* (2013.01); *C08K 5/526* (2013.01); *C08K 5/5313* (2013.01)

(58) Field of Classification Search
USPC ................................................. 528/196, 198
See application file for complete search history.

(56) References Cited

U.S. PATENT DOCUMENTS

| | | |
|---|---|---|
| 3,799,953 A | 3/1974 | Freitag et al. |
| 4,546,172 A | 10/1985 | Kohyama et al. |
| 4,668,768 A | 5/1987 | Mendiratta et al. |
| 4,916,189 A | 4/1990 | Fontana et al. |
| 5,849,845 A | 12/1998 | Kohler et al. |
| 5,852,157 A | 12/1998 | Zaby et al. |
| 6,214,892 B1 | 4/2001 | He et al. |
| 6,225,436 B1 | 5/2001 | Eiffler et al. |
| 7,947,803 B2 | 5/2011 | Hong et al. |
| 8,871,858 B2 | 10/2014 | Volkers et al. |
| 9,193,824 B2 | 11/2015 | Yamaoka et al. |
| 9,499,694 B2 | 11/2016 | Takimoto et al. |
| 9,688,843 B2 | 6/2017 | Bahn et al. |
| 2003/0027905 A1 | 2/2003 | Mahood et al. |
| 2007/0232744 A1 | 10/2007 | Volkers et al. |
| 2009/0162628 A1 | 6/2009 | Kurokawa et al. |
| 2014/0343200 A1* | 11/2014 | Takimoto ............ C08K 5/1515 524/109 |
| 2015/0368458 A1 | 12/2015 | Sun et al. |
| 2017/0198091 A1 | 7/2017 | Nagao et al. |

FOREIGN PATENT DOCUMENTS

| | | |
|---|---|---|
| CN | 101845213 A | 9/2010 |
| CN | 102002226 A | 4/2011 |
| CN | 102492277 B | 10/2013 |
| CN | 102617997 B | 8/2014 |
| EP | 2792711 A1 | 10/2014 |
| JP | 02080421 A | 3/1990 |
| JP | 08169959 A | 7/1996 |
| JP | 09241389 A | 9/1997 |
| JP | 3237814 B2 | 12/2001 |
| JP | 3299570 B2 | 7/2002 |
| JP | 2013095877 A | 5/2013 |
| JP | 2013199636 A | 10/2013 |
| JP | 2013209581 A | 10/2013 |
| JP | 2013209582 A | 10/2013 |
| JP | 2015526581 A | 9/2015 |
| JP | 2015227416 A | 12/2015 |
| JP | 5893856 B2 | 3/2016 |
| JP | 6215717 B2 | 10/2017 |
| KR | 1020030045665 A | 6/2003 |
| KR | 1020080105143 A | 12/2008 |
| KR | 1020090013211 A | 2/2009 |
| KR | 1020110111394 A | 10/2011 |
| KR | 1020130018988 A | 2/2013 |
| KR | 1020140119018 A | 10/2014 |
| KR | 1020160062796 A | 6/2016 |

* cited by examiner

*Primary Examiner* — Terressa Boykin
(74) *Attorney, Agent, or Firm* — Dentons US LLP

(57) ABSTRACT

The present invention provides a method for preparing a polycarbonate by removing a solvent from a polycarbonate polymerization solution without impairing the physical properties of the polycarbonate.

12 Claims, No Drawings

# METHOD FOR PREPARING POLYCARBONATE

TECHNICAL FIELD

Cross-Reference to Related Application(s)

This application is a National Stage Application of International Application No. PCT/KR2017/006904, filed Jun. 29, 2017, and claims the benefit of Korean Patent Application No. 10-2016-0111868, filed on Aug. 31, 2016, contents of which are incorporated herein by reference in their entirety for all purposes as if fully set forth below.

The present invention provides a method for preparing a polycarbonate by removing a solvent from a polycarbonate polymerization solution without impairing the physical properties of the polycarbonate.

BACKGROUND ART

Polycarbonates are resins prepared by condensation-polymerization of an aromatic diol such as bisphenol A with a carbonate precursor such as a phosgene, and have excellent impact strength, dimensional stability, heat resistance and transparency. Thus, they are applied in a wide range of fields such as exterior materials of electrical and electronic products, automobile parts, building materials, and optical components. The method for preparing polycarbonates can be divided into a melt polymerization process and a solid phase polymerization process without using a phosgene, and an interfacial polymerization process using a phosgene.

First, the melt polymerization process is a process of performing polymerization in a state where the raw monomer is melted, and has the advantage of having a low risk because it does not use toxic materials, but high-temperature and high-vacuum facilities are needed during the treatment of highly viscous reactants, and thus there is a problem that the quality is deteriorated. The solid phase polymerization process is a process of performing polymerization at a temperature lower than the melting temperature after the crystallization of low molecular weight polycarbonate prepolymers. In the solid phase polymerization process, since toxic materials are not used and the reaction is performed in a solid state, it can suppress the deterioration of quality. However, there is a disadvantage that it requires a high-pressure equipment and it is difficult to apply to a continuous process.

As disclosed in U.S. Pat. No. 3,799,953, the interfacial polymerization process is a process in which an aromatic hydroxy compound such as bisphenol A and a gaseous phosgene are mixed in an organic solvent to perform a polymerization reaction in the interface between the aqueous solution layer and the organic solvent layer. This process has an advantage that polycarbonate can be relatively easily produced by a continuous process, but a step of removing the organic solvent is necessary.

Since the polycarbonates produced by the interfacial polymerization process as described above are dissolved in an organic solvent, a process of removing the solvent to obtain polymer particles is required, and this process is generally referred to as a solidification process.

In this regard, U.S. Pat. Nos. 4,546,172 and 6,214,892 disclose a method for obtaining water-dispersible polymer particles by spraying a solution in which a polycarbonate is dissolved onto water which is maintained at a temperature higher than the boiling point of a solvent, followed by vaporizing the solvent. However, in the case of the above method, since the solvent evaporates rapidly, the rate of particle formation is fast, but there is a disadvantage in that not only a large sticky agglomerate of particles can be produced but also an additional drying process is required to remove water present in the pores in the porous particles and a lot of energy is required for such a drying process.

Further, U.S. Pat. Nos. 4,668,768 and 7,947,803 disclose a method of using an anti-solvent as a method for obtaining polymer particles from a polymer solution. In the method, the polymer particles are obtained by using an anti-solvent which is thoroughly mixed with a solvent but does not dissolve polymers. However, there exists problems that an excess amount of the anti-solvent must be used as compared to the polymer solution, and that an additional process is required to isolate the anti-solvent from the solvent.

Recently, instead of the method described above, a method of removing a solvent from a solution in which a polycarbonate is dissolved by using high-temperature and high-humidity steam of a steam ejector is used. The method has the advantages that the size of the steam ejector can be increased and the installation is relatively simple.

However, since the steam is a high temperature, discoloration and hydrolysis of the polycarbonate occur in the process of removing the solvent. If discoloration occurs, it may be difficult to recover the polycarbonate in a subsequent process, and further the hydrolysis results in a decrease in molecular weight and a decrease in the physical properties of the polycarbonate. Thus, there is a need for a method that does not impair the physical properties of polycarbonate while removing a solvent from a solution in which a polycarbonate is dissolved using steam.

Accordingly, the present inventors have conducted an extensive research to develop a method of removing a solvent from a polycarbonate polymerization solution, and found that, when an antioxidant and a hydrolysis-resistant agent are added to a polycarbonate polymerization solution and then a solvent is removed using steam, the solvent can be effectively removed without impairing the physical properties of the polycarbonate, thereby completing the present invention.

DETAILED DESCRIPTION OF THE INVENTION

Technical Problem

It is one object of the present invention to provide a method for preparing a polycarbonate by removing a solvent from a polycarbonate polymerization solution without impairing the physical properties of the polycarbonate.

Technical Solution

In order to achieve the object above, the present invention provides a method for preparing a polycarbonate comprising the steps of:

1) adding an antioxidant, and a hydrolysis-resistant agent having an epoxy-fused aliphatic ring to a polycarbonate polymerization solution; and 2) removing a solvent in the polycarbonate polymerization solution by using steam.

As used herein, the term "polycarbonate polymerization solution" refers to a solution in which a polycarbonate prepared by a polymerization process is dissolved in an organic solvent. Specifically, the polycarbonate polymerization solution refers to a polycarbonate polymerization solution prepared by interfacial polymerization process.

The polycarbonate prepared by interfacial polymerization process as described above is in a state of being dissolved in an organic solvent, and thus a process of removing the organic solvent is needed. Accordingly, the present invention is characterized by adding an antioxidant, and a hydrolysis-resistant agent having an epoxy-fused aliphatic ring to a polycarbonate polymerization solution in order to suppress the decrease of the physical properties of the polycarbonate due to high-temperature steam, before removing the organic solvent using steam in Step 2 as described later.

Hereinafter, the present invention will be described in detail for each step.

Adding an Antioxidant, and a Hydrolysis-Resistant Agent Having an Epoxy-Fused Aliphatic Ring to a Polycarbonate Polymerization Solution (Step 1)

Step 1 is a step of adding an antioxidant, and a hydrolysis-resistant agent having an epoxy-fused aliphatic ring to a polycarbonate polymerization solution in order to suppress the decrease of the physical properties of the polycarbonate due to high-temperature steam to be used in Step 2 described later.

Preferably, the polycarbonate polymerization solution refers to a polycarbonate polymerization solution prepared by interfacial polymerization process. The interfacial polymerization of the polycarbonate is widely known in the art, and it refers to polymerizing an aromatic diol compound and a carbonate precursor in the presence of an acid binder, water, and an organic solvent.

The aromatic diol compound and the carbonate precursor are not particularly limited as long as they are used for the production of polycarbonate. For example, as the diol compound, there may be mentioned bisphenol A, 1,1-bis(4-hydroxyphenyl)ethane, bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl) propane, 2,2-bis(4-hydroxy-3-chlorophenyl) propane, 2,2-bis(4-hydroxy-3-methylphenyl)propane, 2,2-bis(4-hydroxy-3,5-dimethyl phenyl) propane, 1,1-bis(4-hydroxyphenyl)-1-phenylethane, bis(4-hydroxyphenyl) diphenylmethane, or a,ω-bis[3-(o-hydroxyphenyl)propyl] polydimethylsiloxane. Further, for example, as the carbonate precursor, there may be mentioned dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene, or bishaloformate.

As the acid binder, for example, an alkali metal hydroxide such as sodium hydroxide, potassium hydroxide and the like, or an amine compound such as pyridine and the like may be used.

The organic solvent is not particularly limited as long as it is a solvent typically used in the polymerization of polycarbonate, and for example, a halogenated hydrocarbon such as methylene chloride, chlorobenzene and the like may be used.

In addition, in the interfacial polymerization, a reaction accelerator, for example, a tertiary amine compound such as triethylamine, tetra-n-butylammonium bromide, tetra-n-butylphosphonium bromide, a quaternary ammonium compound, a quaternary phosphonium compound and the like may be further used in order to accelerate the reaction. The reaction temperature for the interfacial polymerization is preferably 0 to 40° C., and the reaction time is preferably 10 minutes to 5 hours. Further, during the interfacial polymerization reaction, pH is preferably maintained at 9 or more, or 11 or more.

The concentration of the polycarbonate in the polycarbonate polymerization solution is preferably 10% to 35% by weight.

The antioxidant added to the polycarbonate polymerization solution is added to suppress the decrease of the physical properties of the polycarbonate due to high-temperature steam to be used in Step 2 described later, and preferably, at least two types of antioxidants are added. Further, preferably, the antioxidant includes a phosphite-based antioxidant and a hindered phenol-based antioxidant.

Examples of the phosphite-based antioxidant include at least one selected from the group consisting of PEP-36 (bis(2,6-di-ter-butyl-4-methylphenyl)pentaerythritol-diphosphite), and DP9228 (bis(2,4-dicumylphenyl)pentaerythritol diphosphate). Further, examples of the hindered phenol-based antioxidant include IR1010 ([3-[3-(4-hydroxy-3,5-ditert-butyl-phenyl)propanoyloxy]-2,2-bis[3-(4-hydroxy-3,5-ditert-butyl-phenyl)propanoyloxymethyl]propyl] 3-(4-hydroxy-3,5-ditert-butyl-phenyl)propanoate).

In addition, the antioxidant is preferably added in an amount of 100 ppmw to 1,000 ppmw relative to the polycarbonate in the polycarbonate polymerization solution. When the added amount is less than 100 ppmw, the effect of suppressing the decrease of the physical properties of the polycarbonate is insignificant. When the added amount is more than 1,000 ppmw, the effect of suppressing the decrease of the physical properties of the polycarbonate is not substantially enhanced, and the physical properties of the polycarbonate may rather be deteriorated. More preferably, the antioxidant is added in an amount of 150 ppmw or more, 200 ppmw or more, 250 ppmw or more, or 300 ppmw or more, or 900 ppmw or less, 800 ppmw or less, 700 ppmw or less, or 600 ppmw or less relative to the polycarbonate in the polycarbonate polymerization solution.

The hydrolysis-resistant agent having an epoxy-fused aliphatic ring added to the polycarbonate polymerization solution is added to suppress the decrease of the physical properties of the polycarbonate caused by high-temperature steam to be used in Step 2 described later.

Preferably, the hydrolysis-resistant agent having an epoxy-fused aliphatic ring may preferably have 2 or more epoxy-fused aliphatic rings. Examples of the hydrolysis-resistant agent having an epoxy-fused aliphatic ring include C-2021P (3,4-Epoxycyclohexylmethyl 3,4-epoxycyclohexanecarboxylate)

In addition, the hydrolysis-resistant agent having an epoxy-fused aliphatic ring is preferably added in an amount of 100 ppmw to 1,000 ppmw relative to the polycarbonate in the polycarbonate polymerization solution. When the added amount is more than 1,000 ppmw, the effect of suppressing the decrease of the physical properties of the polycarbonate is not substantially enhanced, and the physical properties of the polycarbonate may rather be deteriorated. More preferably, the hydrolysis-resistant agent having an epoxy-fused aliphatic ring is added in an amount of 110 ppmw or more, 120 ppmw or more, 130 ppmw or more, or 140 ppmw or more, 900 ppmw or less, 800 ppmw or less, 700 ppmw or less, 600 ppmw or less, or 500 ppmw or less relative to the polycarbonate in the polycarbonate polymerization solution polycarbonate polymerization solution Removing a Solvent in the Polycarbonate Polymerization Solution by Using Steam (Step 2)

Step 2 is a step of preparing a polycarbonate by removing a solvent from the polycarbonate polymerization reaction to which the antioxidant and the hydrolysis-resistant agent having an epoxy-fused aliphatic ring are added in Step 1. The polycarbonate prepared in Step 2 is present as a solid because the solvent has been removed.

Specifically, a steam ejector is used to remove the solvent in the polycarbonate polymerization solution. The steam ejector is well known in the art, and it uses high-temperature and high-pressure steam to remove the solvent from the polycarbonate polymerization solution. That is, the solvent can be removed in such a way in which high-temperature and high-pressure steam higher than the boiling point of the solvent of the polycarbonate polymerization solution is brought into contact with the polycarbonate polymerization solution to evaporate the solvent.

Preferably, the temperature of the steam is 210° C. to 230° C. Further, the pressure of the steam is 17 to 23 $kgf/cm^2$.

The temperature of the steam is high, but as described above, the polycarbonate polymerization solution includes the antioxidant and hydrolysis-resistant agent having an epoxy-fused aliphatic ring, and thus, it is possible to effectively remove the solvent while suppressing the decrease of the physical properties of the polycarbonate.

Specifically, the polycarbonate prepared in Step 2 has a YI value of 1.0 or less as measured according to ASTM D1925.

Further, the polycarbonate prepared in Step 2 has a reduction in weight average molecular weight of 400 g/mol or less after allowing to stand at 85° C. and 85% relative humidity for 168 hours.

Furthermore, the polycarbonate prepared in Step 2 has a reduction in impact strength at room temperature (measured at 23° C. according to ASTM D256 (⅛ inch, Notched Izod)) of 100 J/m or less after allowing it to stand for 168 hours at 85° C. and 85% relative humidity.

According to one embodiment of the present invention, the polycarbonate prepared by the preparation method according to the present invention exhibits excellent effects in YI, reduction in weight average molecular weight, and reduction in impact strength at room temperature.

Advantageous Effects

As described above, the method for preparing a polycarbonate according to the present invention can effectively remove a solvent without impairing the physical properties of the polycarbonate by adding an antioxidant, and hydrolysis-resistant agent having an epoxy-fused aliphatic ring and then removing the solvent by using steam.

DETAILED DESCRIPTION OF THE EMBODIMENTS

Below, preferred examples are provided to aid in the understanding of the present invention. However, the following examples are provided only for illustration of the invention, and should not be construed as limiting the scope of the present invention thereto.

Preparation Example: Polycarbonate Polymerization Solution 978.4 g of bisphenol A (BPA), 1,620 g of a 32% aqueous NaOH solution, and 7,500 g of distilled water were added to a 20 L glass reactor, and after confirming that BPA was completely dissolved under a nitrogen atmosphere, 3,670 g of methylene chloride and 18.3 g of p-tert-butylphenol (PTBP) were added and mixed. 3,850 g of methylene chloride in which 542.5 g of triphosgene (TPG) was dissolved was added dropwise thereto for 1 hour. At this time, the pH was maintained at 12 using an aqueous NaOH solution. After completion of the dropwise addition, the mixture was aged for 15 minutes, and 195.7 g of triethylamine was dissolved in methylene chloride and added to the mixture. After 10 minutes, the pH was adjusted to 3 with a 1N hydrochloric acid aqueous solution, and the resultant was washed with distilled water three times to obtain 8,645 g of a polycarbonate polymerization solution. The weight of the polycarbonate dissolved in the polycarbonate polymerization solution was 1,125 g, and the concentration thereof was about 13% by weight.

Example 1

0.2250 g of IR1010, 0.3374 g of PEP-36, and 0.2250 g of C-2021P were mixed to 4,975 g of the polycarbonate polymerization solution prepared in the Preparation Example. Steam (temperature: 220° C., pressure: 20 $kgf/cm^2$) was sprayed onto the mixed solution using a steam ejector to obtain a solid polycarbonate.

Example 2

0.1688 g of IR1010, 0.3936 g of PEP-36, and 0.2250 g of C-2021P were mixed to 4,975 g of the polycarbonate polymerization solution prepared in the Preparation Example. Steam (temperature: 220° C., pressure: 20 $kgf/cm^2$) was sprayed onto the mixed solution using a steam ejector to obtain a solid polycarbonate.

Example 3

0.2250 g of IR1010, 0.3374 g of DP9228, and 0.2250 g of C-2021P were mixed to 4,975 g of the polycarbonate polymerization solution prepared in the Preparation Example. Steam (temperature: 220° C., pressure: 20 $kgf/cm^2$) was sprayed onto the mixed solution using a steam ejector to obtain a solid polycarbonate.

Example 4

0.1688 g of IR1010, 0.3936 g of DP9228, and 0.2250 g of C-2021P were mixed to 4,975 g of the polycarbonate polymerization solution prepared in the Preparation Example. Steam (temperature: 220° C., pressure: 20 $kgf/cm^2$) was sprayed onto the mixed solution using a steam ejector to obtain a solid polycarbonate.

Comparative Example 1

0.5623 g of P-168 was mixed to 4,975 g of the polycarbonate polymerization solution prepared in the Preparation Example. Steam (temperature: 220° C., pressure: 20 $kgf/cm^2$) was sprayed onto the mixed solution using a steam ejector to obtain a solid polycarbonate.

Comparative Example 2

0.2250 g of IR1010 and 0.3374 g of PEP-36 were mixed to 4,975 g of the polycarbonate polymerization solution prepared in the Preparation Example. Steam (temperature:

220° C., pressure: 20 kgf/cm²) was sprayed onto the mixed solution using a steam ejector to obtain a solid polycarbonate.

Comparative Example 3

0.2250 g of IR1010, 0.3374 g of PEP-36, and 0.2250 g of ADR4370 were mixed to 4,975 g of the polycarbonate polymerization solution prepared in the Preparation Example. Steam (temperature: 220° C., pressure: 20 kgf/cm²) was sprayed onto the mixed solution using a steam ejector to obtain a solid polycarbonate.

Experimental Example 0.050 part by weight of tris (2,4-di-tert-butylphenyl) phosphite, 0.010 part by weight of octadecyl-3-(3,5-di-tert-butyl-4-hydroxyphenyl)propionate, and 0.030 part by weight of pentaerythritol tetrastearate were added to each solid polycarbonate prepared in Examples and Comparative Examples, pelletized using a ϕ30 mm twin-screw extruder provided with a vent, and then injection-molded at a cylinder temperature of 300° C. and a mold temperature of 80° C. using an N-20C injection molding device from JSW, Ltd., to manufacture each molded specimen.

The properties of the above specimens were measured by the following methods, and the results are shown in Table 1 below.

1) YI (Yellow Index): Specimen (length/width/thickness=60 mm/40 mm/3 mm) was injection-molded at 300° C., and then YI (Yellow Index) of the specimen was measured using Color-Eye 7000A (X-Rite) according to ASTM D1925. Meanwhile, the measurement conditions for YI (Yellow Index) were as follows:

Measurement temperature: Room temperature (23° C.)
Aperture size: Large area of view
Measurement method: Transmittance was measured in spectral range (360 nm to 750 nm)

2) Reduction in weight average molecular weight (ΔMw) and reduction in impact strength at room temperature (ΔNotched Izod Impact): The weight average molecular weight ($Mw_0$) was measured by calibrating according to the PC standard using Agilent 1200 series. Further, the impact strength at room temperature ($NII_0$) was measured at 23° C. according to ASTM D256 (⅛ inch, Notched Izod). Subsequently, the specimen was allowed to stand for 168 hours at 85° C. and 85% relative humidity using a thermo-hygrostat (JEIO TECH, TH-KE), and then the weight average molecular weight ($Mw_1$) and the impact strength at room temperature ($NII_1$) were measured in the same manner, and the difference therebetween ($Mw_0$-$Mw_1$ and $NII_0$-$NII_1$) was each measured.

The results are shown in Table 1 below.

TABLE 1

| | Antioxidant (ppmw) | | | Hydrolysis-resistant agent (ppmw) | | YI | ΔMw (g/mol) | ΔNII (J/m) |
|---|---|---|---|---|---|---|---|---|
| | P-168 | IR1010 | PEP-36 | DP9228 | C-2021P | ADR4370 | | | |
| Ex. 1 | — | 200 | 300 | — | 200 | — | 0.94 | 310 | 5 |
| Ex. 2 | — | 150 | 350 | — | 200 | — | 0.92 | 370 | 5 |
| Ex. 3 | — | 200 | — | 300 | 200 | — | 0.83 | 350 | 5 |
| Ex. 4 | — | 150 | — | 350 | 200 | — | 0.81 | 390 | 6 |
| Comparative Ex. 1 | 500 | — | — | — | — | — | 1.02 | 840 | 31 |
| Comparative Ex. 2 | — | 200 | 300 | — | — | — | 0.94 | 2,600 | 190 |
| Comparative Ex. 3 | — | 200 | 300 | — | — | 200 | 1.07 | 380 | 6 |

The following antioxidants and hydrolysis-resistant agents were used.
P-168: Tris(2,4-ditert-butylphenyl)phosphite (IRGAFOS ® 168)
IR1010: [3-[3-(4-hydroxy-3,5-ditert-butyl-phenyl)propanoyloxy]-2,2-bis[3-(4-hydroxy-3,5-ditert-butyl- phenyl)propanoyloxymethyl[propyl] 3-(4-hydroxy-3,5-ditert-butyl-phenyl)propanoate
PEP-36: Bis(2,6-di-ter-butyl-4-methylphenyl)pentaerythritol-diphosphite
DP9228: bis(2,4-dicumylphenyl)pentaerythritol diphosphite
C-2021P: 3,4-Epoxycyclohexylmethyl 3,4-epoxycyclohexanecarboxylate
ADR4370: JONCRYL ® ADR-4370

The invention claimed is:

1. A method for preparing a polycarbonate, comprising the steps of:
   1) adding an antioxidant, and a hydrolysis-resistant agent having an epoxy-fused aliphatic ring, to a polycarbonate polymerization solution; and
   2) spraying steam at a temperature higher than a boiling point of removing a solvent in the polycarbonate polymerization solution onto the polycarbonate polymerization solution to evaporate the solvent to yield a solid polycarbonate.

2. The method for preparing a polycarbonate of claim 1, wherein the solvent of the polycarbonate polymerization solution is methylene chloride, or chlorobenzene.

3. The method for preparing a polycarbonate of claim 1, wherein at least two types of antioxidants are added.

4. The method for preparing a polycarbonate of claim 1, wherein the antioxidant comprises a phosphite-based antioxidant, and a hindered phenol-based antioxidant.

5. The method for preparing a polycarbonate of claim 1, wherein the antioxidant is added in an amount of 100 ppmw to 1,000 ppmw relative to the polycarbonate in the polycarbonate polymerization solution.

6. The method for preparing a polycarbonate of claim 1, wherein the hydrolysis-resistant agent is added in an amount of 100 ppmw to 1,000 ppmw relative to the polycarbonate in the polycarbonate polymerization solution.

7. The method for preparing a polycarbonate of claim 1, wherein the temperature of the steam is 210° C. to 230° C.

8. The method for preparing a polycarbonate of claim 1, wherein the pressure of the steam is 17 to 23 kgf/cm$^2$.

9. The method for preparing a polycarbonate of claim 1, wherein the prepared polycarbonate has a YI value of 1.0 or less as measure according to ASTM D1925.

10. The method for preparing a polycarbonate of claim 1, wherein the prepared polycarbonate has a reduction in weight average molecular weight of 400 g/mol or less after allowing it to stand for 168 hours at 85° C. and 85% relative humidity.

11. The method for preparing a polycarbonate of claim 1, wherein the prepared polycarbonate has a reduction in impact strength at room temperature (measured at 23° C. according to ASTM D256 (⅛ inch, Notched Izod)) of 100 J/m after allowing it to stand for 168 hours at 85° C. and 85% relative humidity.

12. The method for preparing a polycarbonate of claim 1, wherein a steam ejector is used for spraying the steam onto polycarbonate polymerization solution.

* * * * *